United States Patent
Kosai

(10) Patent No.: US 12,516,144 B2
(45) Date of Patent: Jan. 6, 2026

(54) RUBBER COMPOSITION AND RUBBER PRODUCT

(71) Applicant: BRIDGESTONE CORPORATION, Tokyo (JP)

(72) Inventor: Tomoyuki Kosai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 611 days.

(21) Appl. No.: 17/995,524

(22) PCT Filed: Apr. 15, 2021

(86) PCT No.: PCT/JP2021/015621
§ 371 (c)(1),
(2) Date: Oct. 5, 2022

(87) PCT Pub. No.: WO2021/220831
PCT Pub. Date: Nov. 4, 2021

(65) Prior Publication Data
US 2023/0151132 A1    May 18, 2023

(30) Foreign Application Priority Data
Apr. 30, 2020 (JP) .................... 2020-080713

(51) Int. Cl.
| | |
|---|---|
| *C08F 236/06* | (2006.01) |
| *B60C 1/00* | (2006.01) |
| *C08F 212/08* | (2006.01) |
| *C08K 3/04* | (2006.01) |
| *C08K 5/372* | (2006.01) |

(52) U.S. Cl.
CPC .............. *C08F 236/06* (2013.01); *B60C 1/00* (2013.01); *C08F 212/08* (2013.01); *C08K 3/04* (2013.01); *C08K 5/372* (2013.01)

(58) Field of Classification Search
CPC ...... C08F 236/08; C08F 212/08; C08K 5/372; C08K 3/04; B60C 1/00
USPC ....................................................... 524/609
See application file for complete search history.

(56) References Cited

U.S. PATENT DOCUMENTS

| | | | |
|---|---|---|---|
| 9,637,619 B2 | 5/2017 | Feldhues et al. | |
| 9,845,384 B2 | 12/2017 | Cossu et al. | |
| 2011/0003932 A1 | 1/2011 | Steinhauser et al. | |
| 2013/0281609 A1 | 10/2013 | Steinhauser et al. | |

FOREIGN PATENT DOCUMENTS

| | | | | |
|---|---|---|---|---|
| CN | 101578185 A | 11/2009 | | |
| CN | 101821328 A | 9/2010 | | |
| CN | 105848923 A | 8/2016 | | |
| EP | 2 102 017 B1 | 12/2010 | | |
| EP | 2 724 870 A1 | 4/2014 | | |
| EP | 3 083 276 A1 | 10/2016 | | |
| JP | 2013-108003 A | 6/2013 | | |
| JP | 2017-502137 A | 1/2017 | | |
| WO | WO-2008071208 A1 * | 6/2008 | ........... | B60C 1/0016 |

OTHER PUBLICATIONS

Chinese Search Report issued Mar. 29, 2024 in Application No. 202180031275.X.
Extended European Search Report issued Aug. 23, 2023 in Application No. 21796726.4.
International Search Report for PCT/JP2021/015621, dated Jun. 15, 2021.
International Preliminary Report on Patentability dated Oct. 27, 2022, with translation of Written Opinion, issued in International Application No. PCT/JP2021/015621.

* cited by examiner

*Primary Examiner* — Deve V Hall
(74) *Attorney, Agent, or Firm* — Sughrue Mion, PLLC

(57) ABSTRACT

Provided is a rubber composition that can improve the balance between the hysteresis loss of rubber at low strain and the hysteresis loss of rubber at high strain. The rubber composition comprises a rubber component, and at least one compound selected from the group consisting of the general formulas (1) and (2), $$HS-R-COOM \qquad (1), \text{ and}$$
$$MOCO-R-(S)_n-R-COOM \qquad (2),$$

where R is independently a linear or branched hydrocarbylene group having 8 or more carbon atoms in a linear portion connecting the sulfur atom and the COOM group; M is independently an atom selected from the group consisting of an alkali metal and an alkaline earth metal; and n is an integer from 2 to 8.

13 Claims, No Drawings

RUBBER COMPOSITION AND RUBBER PRODUCT

CROSS REFERENCE TO RELATED APPLICATION

This application is a National Stage of International Application No. PCT/JP2021/015621 filed Apr. 15, 2021, claiming priority based on Japanese Patent Application No. 2020-080713 filed on Apr. 30, 2020, the entire disclosure of which is incorporated herein by reference.

TECHNICAL FIELD

This disclosure relates to a rubber composition and a rubber product.

BACKGROUND

Rubber hysteresis loss (hereinafter may be simply referred to as "loss") is the energy lost during the history of deformation of rubber, and it refers to the difference between the energy applied during the deformation of a substance and the energy restored during the recovery. This difference changes to heat or sound. Therefore, it is known that the hysteresis loss of rubber has a great influence on, for example, the fuel efficiency of a tire and the damping performance of a seismic isolation rubber.

For example, JP 2013-108003 A (PTL 1) describes a method of producing a rubber composition having small hysteresis loss, low heat generating properties, and improved wear resistance.

CITATION LIST

Patent Literature

PTL 1: JP 2013-108003 A

SUMMARY

Technical Problem

By reducing the loss of rubber at low strain, the rubber obtains improved low heat generating properties (that is, higher fuel efficiency). However, if the loss of rubber at high strain is also reduced, the energy dissipation performance is deteriorated, which may lead to a decrease in durability. On the contrary, if the loss is increased to improve the durability, the loss at low strain is increased, which may lead to deterioration of heat generating properties.

It could thus be helpful to provide a rubber composition that can improve the balance between the hysteresis loss of rubber at low strain and the hysteresis loss of rubber at high strain.

Solution to Problem

The rubber composition according to the present disclosure is a rubber composition comprising:
a rubber component, and
at least one compound selected from the group consisting of the following general formulas (1) and (2), $$HS\text{—}R\text{—}COOM \quad (1), \text{ and}$$

$$MOCO\text{—}R\text{—}(S)_n\text{—}R\text{—}COOM \quad (2),$$

where
R is independently a linear or branched hydrocarbylene group having 8 or more carbon atoms in a linear portion connecting the sulfur atom and the COOM group;
M is independently an atom selected from the group consisting of an alkali metal and an alkaline earth metal; and
n is an integer from 2 to 8.

This makes it possible to improve the balance between the hysteresis loss of rubber at low strain and the hysteresis loss of rubber at high strain.

The rubber product according to the present disclosure is a rubber product produced using any of the above rubber compositions. As a result, it obtains excellent balance between the hysteresis loss at low strain and the hysteresis loss at high strain.

Advantageous Effect

According to the present disclosure, it is possible to provide a rubber composition that can improve the balance between the hysteresis loss of rubber at low strain and the hysteresis loss of rubber at high strain. Further, according to the present disclosure, it is possible to provide a rubber product having excellent balance between the hysteresis loss at low strain and the hysteresis loss at high strain.

DETAILED DESCRIPTION

The following describes embodiments of the present disclosure. It should be noted that the descriptions given below are illustrative purposes only and shall not be construed as limiting the scope of the present disclosure.

Two or more embodiments may be arbitrarily combined in the present disclosure.

In the present specification, a numerical range includes the lower limit value and the upper limit value of the range unless otherwise specified. For example, "20 parts by mass to 150 parts by mass" means 20 parts by mass or more and 150 parts by mass or less.

(Rubber Composition)

The rubber composition according to the present disclosure is a rubber composition comprising
a rubber component, and
at least one compound selected from the group consisting of the following general formulas (1) and (2), $$HS\text{—}R\text{—}COOM \quad (1), \text{ and}$$

$$MOCO\text{—}R\text{—}(S)_n\text{—}R\text{—}COOM \quad (2),$$

where
R is independently a linear or branched hydrocarbylene group having 8 or more carbon atoms in a linear portion connecting the sulfur atom and the COOM group;
M is independently an atom selected from the group consisting of an alkali metal and an alkaline earth metal; and
n is an integer from 2 to 8.

The following exemplifies and describes the rubber component and the compounds of the general formulas (1) and (2) of the rubber composition according to the present disclosure.

Rubber Component

The rubber component is not particularly limited, and a known rubber component of rubber composition may be used. Examples of the rubber component include natural rubber (NR), synthetic isoprene rubber (IR), butadiene rubber (BR), styrene butadiene rubber (SBR), acrylonitrilebutadiene rubber (NBR), butyl rubber (IIR), chloroprene rubber, ethylene-propylene rubber (EPM), ethylene-propylene-diene rubber (EPDM), polysulfide rubber, silicone rubber, fluororubber, and urethane rubber. The rubber component may be modified or unmodified.

The rubber component may be a known diene-based polymer for rubber composition.

The rubber component may be used alone or in combination of two or more.

In one embodiment, the rubber component is at least one selected from the group consisting of NR, IR, BR, SBR and modified derivatives thereof.

When SBR is used as the rubber component, the styrene content in the SBR is not particularly limited and can be appropriately adjusted. The styrene content in the SBR is, for example, in a range of more than 0% by weight and 50% by weight or less. In one embodiment, the styrene content in the SBR is more than 0% by weight, 1% by weight or more, 3% by weight or more, 5% by weight or more, 10% by weight or more, 15% by weight or more, 20% by weight or more, 30% by weight or more, or 40% by weight or more. In another embodiment, the styrene content in the SBR is 50% by weight or less, 45% by weight or less, 40% by weight or less, 30% by weight or less, 20% by weight or less, 15% by weight or less, 10% by weight or less, or 5% by weight or less.

When SBR is used as the rubber component, the vinyl content of the butadiene moiety of the SBR is not particularly limited and can be appropriately adjusted. The vinyl content of the butadiene moiety of the SBR is, for example, 1 mol % to 70 mol %. In one embodiment, the vinyl content of the butadiene moiety of the SBR is 1 mol % or more, 5 mol % or more, 10 mol % or more, 20 mol % or more, 30 mol % or more, 35 mol % or more, 40 mol % or more, 45 mol % or more, 50 mol % or more, or 60 mol % or more. In another embodiment, the vinyl content of the butadiene moiety of the SBR is 70 mol % or less, 60 mol % or less, 50 mol % or less, 45 mol % or less, 40 mol % or less, 35 mol % or less, 30 mol % or less, 20 mol % or less, 10 mol % or less, or 5 mol % or less.

The weight average molecular weight (Mw) of the rubber component is not particularly limited and can be appropriately adjusted. The Mw of the rubber component is, for example, 10,000 to 10,000,000. In one embodiment, the Mw of the rubber component is 10,000 or more, 50,000 or more, 100,000 or more, 150,000 or more, 200,000 or more, 250,000 or more, 300,000 or more, 400,000 or more, 500,000 or more, 1,000,000 or more, or 5,000,000 or more. In another embodiment, the Mw of the rubber component is 10,000,000 or less, 5,000,000 or less, 4,000,000 or less, 3,000,000 or less, 2,000,000 or less, 1,000,000 or less, 500,000 or less, 400,000 or less, 300,000 or less, 250,000 or less, 200,000 or less, 150,000 or less, or 100,000 or less.

The Mw of the rubber component can be obtained by performing measurement by gel permeation chromatography and converting the result in terms of monodisperse polystyrene.

Compounds of General Formulas (1) and (2)

In the rubber composition according to the present disclosure, the compounds of the general formulas (1) and (2) are blended with the rubber component to obtain an effect of improving the balance between the loss at low strain and the loss at high strain.

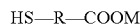  (1), and

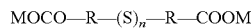  (2), where
R is independently a linear or branched hydrocarbylene group having 8 or more carbon atoms in a linear portion connecting the sulfur atom and the COOM group;
M is independently an atom selected from the group consisting of an alkali metal and an alkaline earth metal; and
n is an integer from 2 to 8.

Although it is not desired to be bound by theory, the reasons for improving the balance are presumed to be, for example, as follows:
(i) the sulfur atom in the compounds of the general formulas (1) and (2) reacts with the rubber component to introduce a COOM group into the rubber component;
(ii) the M of a plurality of COOM groups and the COOM moiety of the COOM group are coordinated to form a noncovalent bond between the networks of the polymers of the rubber component;
(iii) when a vulcanized rubber composition or rubber product is at low strain, the noncovalent bond, as well as the sulfur-sulfur bond due to vulcanization, fixes the network and suppresses the occurrence of loss, and when it is at high strain, the weak noncovalent bond is cleaved to increase energy dissipation and improve rubber durability, and once the strain is eliminated, the noncovalent bond is formed again to be responsive to low strain and high strain.

In the compounds of the general formulas (1) and (2), R is independently a linear or branched hydrocarbylene group having 8 or more carbon atoms in a linear portion connecting the sulfur atom and the COOM group. For example, in the case of a linear hydrocarbylene group having 8 carbon atoms, the structure of the compound of the general formula (1) is HS—$(CH_2)_8$—COOM. Further, R may be a branched hydrocarbylene group as long as the number of carbon atoms in a linear portion connecting the sulfur atom and the COOM group is 8 or more. For example, in the case of the structure of HS—$CH(CH_3)$—$(CH_2)_7$—COOM, R has 8 carbon atoms in the linear portion connecting the sulfur atom and the COOM group, and it is a hydrocarbylene group branched at carbon adjacent to the sulfur atom.

The number of carbon atoms in a linear portion connecting the sulfur atom and the COOM group in R of the compounds of the general formulas (1) and (2) is, for example, 8 to 30. In one embodiment, the number of carbon atoms in a linear portion connecting the sulfur atom and the COOM group in R of the compounds of the general formulas (1) and (2) is 8 or more, 10 or more, 12 or more, 14 or more, 16 or more, 18 or more, 20 or more, 22 or more, 24 or more, 26 or more, or 28 or more. In another embodiment, the number of carbon atoms in a linear portion connecting the sulfur atom and the COOM group in R of the compounds of the general formulas (1) and (2) is 30 or less, 28 or less, 26 or less, 24 or less, 22 or less, 20 or less, 18 or less, 16 or less, 14 or less, 12 or less, or 10 or less.

In one embodiment, the number of carbon atoms in a linear portion connecting the sulfur atom and the COOM group in R of the compounds of the general formulas (1) and (2) is 10 or more. As a result, the compound is easily mixed with the rubber component, and the compound efficiently reacts with the rubber component.

When R of the compounds of the general formulas (1) and (2) is a branched hydrocarbylene group, the total number of carbon atoms in the hydrocarbylene group is, for example, 9 to 50. In one embodiment, when R of the compounds of the general formulas (1) and (2) is a branched hydrocarbylene group, the total number of carbon atoms in the hydrocarbylene group is 9 or more, 10 or more, 15 or more, 20 or more, 25 or more, 30 or more, 35 or more, 40 or more, or 45 or more. In another embodiment, when R of the compounds of the general formulas (1) and (2) is a branched hydrocarbylene group, the total number of carbon atoms in the hydrocarbylene group is 50 or less, 45 or less, 40 or less, 35 or less, 30 or less, 25 or less, 20 or less, 15 or less, or 10 or less.

In one embodiment, when R of the compounds of the general formulas (1) and (2) is a branched hydrocarbylene group, the number of carbon atoms in a linear portion connecting the sulfur atom and the COOM group is more than the number of carbon atoms of a branched chain that branches out from the straight chain.

In one embodiment, the R is a linear hydrocarbylene group.

In one embodiment, R of the compounds of the general formulas (1) and (2) is a branched hydrocarbylene group, which is branched at carbon adjacent to a sulfur atom. Examples of such a compound of the general formula (1) include HS—CH($CH_3$)—($CH_2$)$_7$—COOM.

In one embodiment, R of the compounds of the general formulas (1) and (2) is a branched hydrocarbylene group, which is branched at two carbons adjacent to a sulfur atom. Examples of such a compound of the general formula (1) include HS—($CH_2$)—CH($CH_3$)—($CH_2$)$_6$—COOM.

In one embodiment, R of the compounds of the general formulas (1) and (2) is a branched hydrocarbylene group, which is branched at three, four, five, six, seven, or eight carbons adjacent to a sulfur atom.

In one embodiment, the compounds of the general formulas (1) and (2) do not include compounds branched from carbon adjacent to a sulfur atom.

In another embodiment, the compounds of the general formulas (1) and (2) are branched at two or more carbons adjacent to a sulfur atom.

The two Rs of the compound of the general formula (2) may be the same or different.

In the compounds of the general formulas (1) and (2), M is independently an atom selected from the group consisting of an alkali metal and an alkaline earth metal. Examples of M include Li, Na, K, Rb, Cs, Fr; Mg, Ca, Sr, Ba, and Ra. In one embodiment, in the compounds of the general formulas (1) and (2), M is at least one independently selected from the group consisting of Li, Na and K. From the viewpoint of the balance between the hysteresis loss at low strain and the hysteresis loss at high strain, M is preferably Na.

In the present disclosure, M of the compounds of the general formulas (1) and (2) is an atom selected from the group consisting of alkali metals and alkaline earth metals. As a result, it is presumed that, as described above, the M of a plurality of COOM groups and the COO moiety of the COOM group are coordinated to form a noncovalent bond between the networks of the polymers of the rubber component. Therefore, when a compound having a carboxyl (COOH) group other than a carboxylate is used, no noncovalent bond is formed by this coordination, and only a weaker noncovalent bond is formed due to the carboxyl group, which may not suppress the occurrence of loss at low strain.

In one embodiment, M in R of the compounds of the general formulas (1) and (2) is Na.

The two Ms of the compound of the general formula (2) may be the same or different.

In the general formula (2), n is an integer selected from 2, 3, 4, 5, 6, 7 and 8.

In one embodiment, n in the compound of the general formula (2) is 2 to 4.

In one embodiment, the rubber composition according to the present disclosure comprises a compound of the general formula (1). In another embodiment, the rubber composition according to the present disclosure comprises a compound of the general formula (2). In another embodiment, the rubber composition according to the present disclosure comprises compounds of the general formulas (1) and (2). In another embodiment, the rubber composition according to the present disclosure comprises a compound of the general formula (1) and does not comprise any compound of the general formula (2). In another embodiment, the rubber composition according to the present disclosure comprises a compound of the general formula (2) and does not comprise any compound of the general formula (1).

In one embodiment, the compound of the general formula (1) is at least one selected from the group consisting of HS—($CH_2$)$_8$—COOLi, HS—($CH_2$)$_8$—COONa, HS—($CH_2$)$_8$—COOK, HS—($CH_2$)$_8$—COOMg, HS—($CH_2$)$_8$—COOCa, HS—($CH_2$)$_{10}$—COOLi, HS—($CH_2$)$_{10}$—COONa, HS—($CH_2$)$_{10}$—COOK, HS—($CH_2$)$_{10}$—COOMg, HS—($CH_2$)$_{10}$—COOCa, HS—($CH_2$)$_{12}$—COOLi, HS—($CH_2$)$_{12}$—COONa, HS—($CH_2$)$_{12}$—COOK, HS—($CH_2$)$_{12}$—COOMg, HS—($CH_2$)$_{12}$—COOCa, HS—($CH_2$)$_{14}$—COOLi, HS—($CH_2$)$_{14}$—COONa, HS—($CH_2$)$_{14}$—COOK, HS—($CH_2$)$_{14}$—COOMg, HS—($CH_2$)$_{14}$—COOCa, HS—($CH_2$)$_{16}$—COOLi, HS—($CH_2$)$_{16}$—COONa, HS—($CH_2$)$_{16}$—COOK, HS—($CH_2$)$_{16}$—COOMg, HS—($CH_2$)$_{16}$—COOCa, HS—($CH_2$)$_{18}$—COOLi, HS—($CH_2$)$_{18}$—COONa, HS—($CH_2$)$_{18}$—COOK, HS—($CH_2$)$_{18}$—COOMg, and HS—($CH_2$)$_{18}$—COOCa.

In one embodiment, the compound of the general formula (2) is at least one selected from the group consisting of LiOCO—($CH_2$)$_8$—(S)$_2$—($CH_2$)$_8$—COOLi, NaOCO—($CH_2$)$_8$—(S)$_2$—($CH_2$)$_8$—COONa, KOCO—($CH_2$)$_8$—(S)$_2$—($CH_2$)$_8$—COOK, MgOCO—($CH_2$)$_8$—(S)$_2$—($CH_2$)$_8$—COOMg, CaOCO—($CH_2$)$_8$—(S)$_2$—($CH_2$)$_8$—COOCa, LiOCO—($CH_2$)$_{10}$—(S)$_2$—($CH_2$)$_{10}$—COOLi, NaOCO—($CH_2$)$_{10}$—(S)$_2$—($CH_2$)$_{10}$—COONa, KOCO—($CH_2$)$_{10}$—(S)$_2$—($CH_2$)$_{10}$—COOK, MgOCO—($CH_2$)$_{10}$—(S)$_2$—($CH_2$)$_{10}$—COOMg, CaOCO—($CH_2$)$_{10}$—(S)$_2$—($CH_2$)$_{10}$—COOCa, LiOCO—($CH_2$)$_{12}$—(S)$_2$—($CH_2$)$_{12}$—COOLi, NaOCO—($CH_2$)$_{12}$—(S)$_2$—($CH_2$)$_{12}$—COONa, KOCO—($CH_2$)$_{12}$—(S)$_2$—($CH_2$)$_{12}$—COOK, MgOCO—($CH_2$)$_{12}$—(S)$_2$—($CH_2$)$_{12}$—COOMg, CaOCO—($CH_2$)$_{12}$—(S)$_2$—($CH_2$)$_{12}$—COOCa, LiOCO—($CH_2$)$_{14}$—(S)$_2$—($CH_2$)$_{14}$—COOLi, NaOCO—($CH_2$)$_{14}$—(S)$_2$—($CH_2$)$_{14}$—COONa, KOCO—($CH_2$)$_{14}$—(S)$_2$—($CH_2$)$_{14}$—COOK, MgOCO—($CH_2$)$_{14}$—(S)$_2$—($CH_2$)$_{14}$—COOMg, CaOCO—($CH_2$)$_{14}$—(S)$_2$—($CH_2$)$_{14}$—COOCa, LiOCO—($CH_2$)$_{16}$—(S)$_2$—($CH_2$)$_{16}$—COOLi, NaOCO—($CH_2$)$_{16}$—(S)$_2$—($CH_2$)$_{16}$—COONa, KOCO—($CH_2$)$_{16}$—(S)$_2$—($CH_2$)$_{16}$—COOK, MgOCO—($CH_2$)$_{16}$—(S)$_2$—($CH_2$)$_{16}$—COOMg, CaOCO—($CH_2$)$_{16}$—(S)$_2$—($CH_2$)$_{16}$—COOCa, LiOCO—($CH_2$)$_{18}$—(S)$_2$—($CH_2$)$_{18}$—COOLi, NaOCO—($CH_2$)$_{18}$—(S)$_2$—($CH_2$)$_{18}$—COONa, KOCO—($CH_2$)$_{18}$—(S)$_2$—($CH_2$)$_{18}$—COOK, MgOCO—($CH_2$)$_{18}$—(S)$_2$—($CH_2$)$_{18}$—COOMg, and CaOCO—($CH_2$)$_{18}$—(S)$_2$—($CH_2$)$_{18}$—COOCa.

The compound of the general formula (1) may be used alone or in combination of two or more.

The compound of the general formula (2) may be used alone or in combination of two or more.

Regarding the total amount of at least one compound selected from the group consisting of the general formulas (1) and (2) in the rubber composition, the total amount of COOM groups in the compound is 2 mmol to 20 mmol with respect to 100 g of the rubber component, for example. In one embodiment, the total amount of at least one compound selected from the group consisting of the general formulas (1) and (2) in the rubber composition is 2 mmol or more, 3 mmol or more, 4 mmol or more, 5 mmol or more, 6 mmol or more, 7 mmol or more, 8 mmol or more, 9 mmol or more, 10 mmol or more, 12 mmol or more, 14 mmol or more, 16 mmol or more, or 18 mmol or more, with respect to 100 g of the rubber component. In another embodiment, the total amount of at least one compound selected from the group consisting of the general formulas (1) and (2) in the rubber composition is 20 mmol or less, 18 mmol or less, 16 mmol or less, 14 mmol or less, 12 mmol or less, 10 mmol or less, 9 mmol or less, 8 mmol or less, 7 mmol or less, 6 mmol or less, 5 mmol or less, 4 mmol or less, or 3 mmol or less, with respect to 100 g of the rubber component.

The rubber composition according to the present disclosure may comprise a known component used in rubber composition in addition to the rubber component and the compounds of the general formulas. Examples of the known component include a filler such as silica and carbon black; a vulcanizing agent (crosslinking agent), a vulcanization accelerator, a vulcanization retarder, an age resistor, stearic acid, zinc oxide, a reinforcing agent, a softener, a vulcanizing co-agent, a colorant, a flame retardant, a lubricant, a foaming agent, a thermoplastic resin, a thermosetting resin, a plasticizer, a processing aid, an antioxidant, an anti-scorch agent, an ultraviolet-rays protecting agent, an antistatic agent, a color protecting agent, and oil. These may be used alone or in combination of two or more, respectively.

Filler

A known filler such as carbon black and silica may be appropriately selected and used as the filler.

(Carbon Black)

The carbon black is not particularly limited and can be appropriately selected according to the purpose. For example, the carbon black may be carbon black of FEF, SRF, HAF, ISAF, and SAF grade. The carbon black may be used alone or in combination of two or more.

The nitrogen adsorption specific surface area ($N_2SA$) of the carbon black is not particularly limited, and it may be, for example, 20 $m^2/g$ to 250 $m^2/g$. The $N_2SA$ of the carbon black is measured in accordance with JIS K 6217-2: 2001.

(Silica)

The silica is not particularly limited and can be used depending on the application. For example, it may be silica of general grade, or special silica that has been subjected to surface treatment with a silane coupling agent or the like.

The silica may be used alone or in combination of two or more.

Examples of the silica include wet silica (hydrous silicate), dry silica (silicic anhydride), calcium silicate, and aluminum silicate, among which wet silica is preferable.

The wet silica may be precipitated silica. The precipitated silica is silica obtained by aggregating primary particles by, at an initial stage of production, advancing the reaction of a reaction solution in a relatively high temperature and neutral to alkaline pH range to grow silica primary particles and then controlling them to acidic pH range.

The cetyltrimethylammonium bromide adsorption specific surface area (CTAB specific surface area) of the silica is not particularly limited and can be appropriately adjusted. The CTAB specific surface area of the silica may be, for example, 70 $m^2/g$ to 250 $m^2/g$.

In the present specification, the CTAB specific surface area refers to a value measured according to ASTM D3765-92. Note that the adsorption cross-sectional area per molecule of cetyltrimethylammonium bromide on the silica surface is 0.35 $nm^2$, and the specific surface area ($m^2/g$) calculated from the adsorption amount of CTAB is defined as the CTAB specific surface area.

The BET specific surface area of the silica is not particularly limited and can be appropriately adjusted. The BET specific surface area of the silica may be, for example, 100 $m^2/g$ to 250 $m^2/g$.

In the present specification, the BET specific surface area refers to a specific surface area determined with the BET method. The BET specific surface area can be measured according to ASTM D4820-93.

The amount of the filler in the rubber composition is, for example, 20 parts by mass to 150 parts by mass with respect to 100 parts by mass of the rubber component.

In one embodiment, the amount of the filler is 20 parts by mass or more, 30 parts by mass or more, 40 parts by mass or more, 50 parts by mass or more, 60 parts by mass or more, 70 parts by mass or more, 80 parts by mass or more, 90 parts by mass or more, 100 parts by mass or more, 110 parts by mass or more, 120 parts by mass or more, 130 parts by mass or more, or 140 parts by mass or more, with respect to 100 parts by mass of the rubber component. In another embodiment, the amount of the filler is 150 parts by mass or less, 140 parts by mass or less, 130 parts by mass or less, 120 parts by mass or less, 110 parts by mass or less, 100 parts by mass or less, 90 parts by mass or less, 80 parts by mass or less, 70 parts by mass or less, 60 parts by mass or less, 50 parts by mass or less, 40 parts by mass or less, or 30 parts by mass or less, with respect to 100 parts by mass of the rubber component.

Method of Preparing Rubber Composition

A method of preparing the rubber composition is not particularly limited except that the rubber composition comprises the rubber component and the compounds of general formulas described above, and a known method of preparing a rubber composition may be used.

For example, when the preparation of the rubber composition includes a non-productive step (also referred to as a non-productive kneading step) and a productive step (also referred to as a productive kneading step), the rubber composition may be prepared by kneading the rubber components that do not contain vulcanization system (vulcanizing agent and vulcanization accelerator); some or all of the compounds of the general formula; filler; and other components such as stearic acid in the non-productive step, and adding a vulcanization system, zinc oxide, and the like to the kneaded product obtained from the non-productive step and kneading the mixture in the productive step.

In one embodiment, when the preparation of the rubber composition includes a non-productive step and a productive step, all the compounds of the general formulas are added in the non-productive step. In another embodiment, when the preparation of the rubber composition includes a non-productive step and a productive step, some of the compounds of the general formulas are added in the non-productive step, and the remaining compounds of the general formulas are added in the productive step.

When the preparation of the rubber composition includes a non-productive step and a productive step, the non-productive step may include only one step or include two steps.

(Rubber Product)

The rubber product according to the present disclosure is a rubber product prepared using any of the above rubber compositions. Examples of the rubber product include a tire; anti-vibration rubber; seismic isolation rubber; a hose; a belt such as a conveyor belt; a rubber pad (MT pad); a rubber crawler; bellows (air spring); a pneumatic chuck such as an air picker and an air gripper; a rubber bearing such as a rubber bearing for bridges; a rubber-coated chain-type bridge collapse prevention unit; and rubber for office equipment such as an OA roller.

In one embodiment, the rubber product is at least one selected from the group consisting of a tire; anti-vibration rubber; seismic isolation rubber; a hose; a belt such as a conveyor belt; a rubber pad (MT pad); a rubber crawler; bellows (air spring); a pneumatic chuck such as an air picker and an air gripper; a rubber bearing such as a rubber bearing for bridges; a rubber-coated chain-type bridge collapse prevention unit; and rubber for office equipment such as an OA roller.

Tire

The tire according to the present disclosure is a tire using any of the above rubber compositions.

The tire is not particularly limited except that any of the above rubber compositions is used, and a known tire configuration and production method can be adopted. Examples of a member in the tire include a tread portion, a shoulder portion, a sidewall portion, a bead portion, a belt layer, and a carcass.

EXAMPLES

The present disclosure will be described in more detail based on examples, which are illustrative purposes only and shall not be construed as limiting the scope of the present disclosure. In the examples, the blending amount is in part by mass unless otherwise specified.

The details of materials used in the examples are as follows. Styrene-butadiene rubber (SBR): styrene content 10% by weight, vinyl content 40 mol %, number average molecular weight 201,000, weight average molecular weight 211,000

| | |
|---|---|
| $SH(CH_2)_{10}COONa$ | Compound of general formula (1) |
| $SHCH_2COONa$ | Comparative compound 1 |
| $SH(CH_2)_{10}COOH$ | Comparative compound 2 |

Filler: carbon black, manufactured by Tokai Carbon Co., Ltd., "Seast7HM" N234

Wax: "SUNTIGHT" manufactured by Seiko-Chemical Co., Ltd.
Age resistor: "NOCRAC 6C" manufactured by Ouchi Shinko Chemical Industrial Co., Ltd.
Vulcanization accelerator 1: bis (2-benzothiazolyl) persulfide
Vulcanization accelerator 2: N-tert-butyl-2-benzothiazolesulfenamide Example 1

Vulcanized rubber was obtained by performing a non-productive step and a productive step with the formulation listed in Table 1. In the non-productive step, the maximum temperature of the rubber composition was adjusted to 150° C. In the productive step, the maximum temperature of the rubber composition was adjusted to 110° C. The blending amount of the compound of the general formula (1) was such that the number of moles of the COONa group was 5 mmol with respect to 100 g of SBR.

Comparative Examples 1 to 3

Vulcanized rubber was obtained in the same manner as in Example 1 except that the formulation of the rubber composition was changed to the formulations listed in Table 1. In Comparative Examples 2 and 3, the comparative compound was blended so that the number of moles of the COONa group or COOH group of the comparative compound was equal to the number of moles of the COONa group of the compound of the general formula (1) of Example 1.

The obtained vulcanized rubber was subjected to the following hysteresis loss measurement.

Hysteresis Loss Measurement

Using a universal material tester (manufactured by INSTRON), a loading-unloading test was performed at a temperature of 25° C., a strain of 10% or a strain of 300%, and a speed of 200 mm/sec, and the ratio of energy loss was measured. With each hysteresis loss of Comparative Example 1 being 100, the hysteresis loss of the other Example and Comparative Examples was indicated as an index. The results are listed in Table 1. It is indicated that the smaller the hysteresis loss at a strain of 10% is, the better the low heat generating properties are, and that the larger the hysteresis loss at a strain of 300% is, the better the durability is.

| | | | Comparative Example 1 | Comparative Example 2 | Comparative Example 3 | Example 1 |
|---|---|---|---|---|---|---|
| Formulation of rubber composition (part by mass) | Non-productive step | SBR | 100 | 100 | 100 | 100 |
| | | Filler | 50 | 50 | 50 | 50 |
| | | Stearic acid | 2 | 2 | 2 | 2 |
| | | Wax | 2 | 2 | 2 | 2 |
| | | Age resistor | 1 | 1 | 1 | 1 |
| | | $HSCH_2COONa$ | — | 0.57 | — | — |
| | | $HS(CH_2)_{10}COOH$ | — | — | 1.1 | — |
| | | $HS(CH_2)_{10}COONa$ | — | — | — | 1.2 |
| | Productive step | Sulfur | 1.2 | 1.2 | 1.2 | 1.2 |
| | | Vulcanization accelerator 1 | 1.6 | 1.6 | 1.6 | 1.6 |
| | | Vulcanization accelerator 2 | 0.6 | 0.6 | 0.6 | 0.6 |
| | | Zinc oxide | 2.5 | 2.5 | 2.5 | 2.5 |
| Physical properties | | Hysteresis loss, 10% | 100 | 111 | 56 | 65 |
| | | Hysteresis loss, 300% | 100 | 113 | — (Broken) | 106 |

From Table 1, it is understood that the vulcanized rubber using the rubber composition according to the present disclosure can improve the balance between the hysteresis loss at low strain and the hysteresis loss at high strain.

INDUSTRIAL APPLICABILITY

According to the present disclosure, it is possible to provide a rubber composition that can improve the balance between the hysteresis loss of rubber at low strain and the hysteresis loss of rubber at high strain. Further, according to the present disclosure, it is possible to provide a rubber product having excellent balance between the hysteresis loss at low strain and the hysteresis loss at high strain.

The invention claimed is:

1. A rubber composition, comprising:
   a rubber component, and
   at least one compound selected from the group consisting of the following general formulas (1) and (2), HS—R—COOM                                               (1), and MOCO—R—(S)$_n$—R—COOM                     (2), wherein
   R is independently a linear or branched hydrocarbylene group having 8 or more carbon atoms in a linear portion connecting the sulfur atom and the COOM group;
   M is independently an atom selected from the group consisting of an alkali metal and an alkaline earth metal;
   n is an integer from 2 to 8; and
   the M of a plurality of COOM groups and the COOM moiety of the COOM group are coordinated to form a noncovalent bond between the networks of the polymers of the rubber component.

2. The rubber composition according to claim 1, wherein the number of the carbon atoms is 10 or more.

3. The rubber composition according to claim 1, wherein the R is a linear hydrocarbylene group.

4. The rubber composition according to claim 1, wherein the M is at least one selected from the group consisting of Li, Na, and K.

5. The rubber composition according to claim 1, wherein the M is Na.

6. The rubber composition according to claim 1, wherein a total amount of COOM groups in the compound is 2 mmol to 20 mmol with respect to 100 g of the rubber component.

7. The rubber composition according to claim 1, further comprising a filler, wherein an amount of the filler is 20 parts by mass to 150 parts by mass with respect to 100 parts by mass of the rubber component.

8. A rubber product produced using the rubber composition according to claim 1.

9. The rubber composition according to claim 2, wherein the R is a linear hydrocarbylene group.

10. The rubber composition according to claim 2, wherein the M is at least one selected from the group consisting of Li, Na, and K.

11. The rubber composition according to claim 2, wherein the M is Na.

12. The rubber composition according to claim 2, wherein a total amount of COOM groups in the compound is 2 mmol to 20 mmol with respect to 100 g of the rubber component.

13. The rubber composition according to claim 2, further comprising a filler, wherein an amount of the filler is 20 parts by mass to 150 parts by mass with respect to 100 parts by mass of the rubber component.

* * * * *